United States Patent
Lee et al.

(10) Patent No.: US 11,905,439 B2
(45) Date of Patent: Feb. 20, 2024

(54) ADHESIVE COMPOSITION

(71) Applicant: LG CHEM, LTD., Seoul (KR)

(72) Inventors: Seung Min Lee, Daejeon (KR); So Young Kim, Daejeon (KR); Se Woo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 881 days.

(21) Appl. No.: 16/964,555

(22) PCT Filed: Jan. 22, 2019

(86) PCT No.: PCT/KR2019/000895
§ 371 (c)(1),
(2) Date: Jul. 23, 2020

(87) PCT Pub. No.: WO2019/146992
PCT Pub. Date: Aug. 1, 2019

(65) Prior Publication Data
US 2021/0032515 A1    Feb. 4, 2021

(30) Foreign Application Priority Data

Jan. 23, 2018 (KR) .......................... 10-2018-0008309

(51) Int. Cl.
| | |
|---|---|
| *C09J 175/04* | (2006.01) |
| *C08G 18/10* | (2006.01) |
| *C08G 18/32* | (2006.01) |
| *C08G 18/62* | (2006.01) |
| *C08G 18/72* | (2006.01) |
| *C08K 3/34* | (2006.01) |
| *C08K 3/36* | (2006.01) |
| *C08K 7/16* | (2006.01) |
| *G02B 27/01* | (2006.01) |

(52) U.S. Cl.
CPC ............ *C09J 175/04* (2013.01); *C08G 18/10* (2013.01); *C08G 18/3206* (2013.01); *C08G 18/6229* (2013.01); *C08G 18/72* (2013.01); *C08K 3/346* (2013.01); *C08K 3/36* (2013.01); *C08K 7/16* (2013.01); *G02B 27/0172* (2013.01); *C08K 2201/003* (2013.01); *C09J 2301/312* (2020.08); *C09J 2475/00* (2013.01); *G02B 2027/0174* (2013.01)

(58) Field of Classification Search
CPC ................ C09J 175/04; C09J 2301/312; C09J 2475/00; C08G 18/10; C08G 18/3206; C08G 18/6229; C08G 18/72; C08K 3/346; C08K 7/16; C08K 2201/003; C08K 3/36; G02B 2027/0174; G02B 27/0172
USPC ....................................................... 524/271
See application file for complete search history.

(56) References Cited

U.S. PATENT DOCUMENTS

| | | | | |
|---|---|---|---|---|
| 2004/0210056 A1* | 10/2004 | Wood | .................... | C07D 211/94 546/223 |
| 2005/0064183 A1 | 3/2005 | Lunsford et al. | | |
| 2013/0136874 A1* | 5/2013 | Xia | .......................... | G02B 1/04 156/99 |
| 2015/0109679 A1* | 4/2015 | Mukawa | ............ | G02B 27/0172 359/618 |
| 2016/0024357 A1* | 1/2016 | Zhang | .................... | C09J 133/14 522/13 |
| 2016/0137756 A1* | 5/2016 | Schellenberg | ............ | C08F 2/22 524/561 |

FOREIGN PATENT DOCUMENTS

| | | | | |
|---|---|---|---|---|
| CN | 101484515 A | 7/2009 | | |
| CN | 103792714 A | 5/2014 | | |
| CN | 103824516 A | 5/2014 | | |
| CN | 104736609 A | 6/2015 | | |
| CN | 104736613 A | 6/2015 | | |
| CN | 106749867  | * 5/2017 | | |
| CN | 107206770 A | 9/2017 | | |
| CN | 107356989 A | * 11/2017 | ........... | B32B 27/283 |
| JP | 6-89462 A | 3/1994 | | |
| JP | 2006-522020 A | 9/2006 | | |
| JP | 2007-065049 A | 3/2007 | | |
| JP | 2009-541554 A | 11/2009 | | |
| JP | 4376957 B2 | 12/2009 | | |
| JP | 2011-221129 A | 11/2011 | | |
| JP | 2013-542455 A | 11/2013 | | |
| JP | 2016505668 A | 2/2016 | | |
| JP | 5943659 B2 | 7/2016 | | |
| JP | 6095069 B2 | 3/2017 | | |
| JP | 2017-142406 A | 8/2017 | | |
| JP | 2019-513165 A | 5/2019 | | |

(Continued)

OTHER PUBLICATIONS

Translation of CN 107356989, Nov. 17, 2017. (Year: 2017).*

(Continued)

*Primary Examiner* — Hui H Chin
(74) *Attorney, Agent, or Firm* — Bryan Cave Leighton Paisner LLP

(57) ABSTRACT

The present disclosure provides an adhesive composition including an aliphatic urethane (meth)acrylate, a thickener and a spacer. The adhesive composition has printability that printing can be effectively performed into a pattern with a thin width or the like, and is capable of forming an adhesive having excellent physical properties such as transparency, a gap maintaining ability capable of maintaining a constant cell gap between films and adhesive force. The adhesive composition is useful for constituting an optical element for HMDs.

16 Claims, No Drawings

(56) References Cited

FOREIGN PATENT DOCUMENTS

| | | |
|---|---|---|
| JP | 2020-117587 A | 8/2020 |
| KR | 20110006008 A | 1/2011 |
| KR | 10-1215157 B1 | 12/2012 |
| KR | 10-1245781 B1 | 3/2013 |
| KR | 20130130698 A | 12/2013 |
| KR | 20150023278 A | 3/2015 |
| KR | 10-1515157 B1 | 4/2015 |
| TW | 200523119 A | 7/2005 |
| WO | 2020195938 A1 | 10/2020 |

OTHER PUBLICATIONS

Translation of CN 106749867, May 31, 2017. (Year: 2017).*

Materials Today Communications, 22, 100780, 2020. (Year: 2020).*

Gultekin, P et al., "Cement Selection for Implant-Supported Crowns Fabricated with Different Luting Space Settings" Feb. 2013, Abstract only (2 pages).

Chen Jian-Lian et al., "Research Progress in Modification of Acrylate Resin" Modern Paint & Finishing, vol. 12, No. 3, Mar. 2009, Abstract only (1 page).

CHEMELITE (Webpage), URL: http://www.chemelite.com/ch/cpzx/gghcl/34.html, dated Jul. 26, 2021 (8 Pages) and English machine translation (9 pages).

CN 9001 NS Technical DataSheet by SpecialChem, URL: https://polymer-additives.specialchem.com/product/m-sartomer-arkema-group-cn-9001-ns, dated Jul. 14, 2021 (1 page).

Miramer PU2200 Technical DataSheet by SpecialChem, URL: https://polymer-additives.specialchem.com/product/m-miwon-miramer-pu2200, dated Jul. 14, 2021 (2 pages).

Sekisui Fine Chemical Division (Webpage), URL: https://www.sekisul-fc.com/ja/micro/u03.html, dated Jul. 26, 2021 (4 pages) and English translation (4 pages).

Nguyen et al., "The Role of Organic and Inorganic UV-absorbents on Photopolymerization and Mechanical Properties of Acrylate-urethane Coating", Materials Today Communications, vol. 22, 8 pages (2020).

* cited by examiner

ADHESIVE COMPOSITION

TECHNICAL FIELD

The present application is a National Phase entry pursuant to 35 U.S.C. § 371 of International Application No. PCT/KR2019/000895 filed on Jan. 22, 2019, and claims the benefit of and priority to the filing date of Korean Patent Application No. 10-2018-0008309 filed on Jan. 23, 2018, all of which are hereby incorporated by reference in their entirety for all purposes as if fully set forth herein.

The present application relates to an adhesive composition.

BACKGROUND ART

A head mounted display (hereinafter, referred to as HMD) is a display device capable of presenting images directly to eyes of a user wearing the display on the head. Among these HMDs, particularly, the see-through HMD (head mounted display) can be utilized in a so-called augmented reality (AR), virtual reality (VR) or mixed reality (MR) field, and the like.

There are various methods as implementation methods of the see-through HMD, but mainly a semi-reflective curved mirror type, a light guide type or a waveguide type, and the like are used. Among the above, the waveguide-type HMD comprises an optical element in which a plurality of optical films, for example, diffraction pattern films or waveguide films, and the like are laminated.

DISCLOSURE

Technical Problem

The present application provides an adhesive composition.

Technical Solution

Among physical properties mentioned in this specification, when the measured temperature affects the relevant physical property, the physical property is measured at room temperature, unless otherwise specified. The term room temperature is a natural temperature without warming or cooling, which may mean, for example, a temperature in a range of about 10° C. to about 30° C., or a temperature of about 23° C. or about 25° C. or so. In addition, unless otherwise specified, the unit of temperature herein is ° C.

In addition, among physical properties mentioned in this specification, when the measured pressure affects the relevant physical property, the physical property is measured at normal pressure, that is, at atmospheric pressure (about 1 atm or so), unless otherwise specified.

The present application relates to an adhesive composition. In one example, the adhesive composition can be used to construct optical elements used in HMDs. Among the optical elements for the HMD, there is an optical element which is formed by laminating at least two or more optical films in a state of being spaced apart at a certain interval using an adhesive. The optical film used in the optical element is usually a diffraction pattern film, a holographic film, a waveguide film having a waveguide function, a diffraction light guiding film or the like. The adhesive composition used to laminate at least two optical films as above in a state of being spaced apart from each other is required to have transparency, a gap maintaining ability capable of maintaining a constant cell gap between films, adhesive force and application processability which also allows uniform printing into a pattern having a thin width and simultaneously can maintain the width of the pattern under the subsequently applied pressure, and the like. The adhesive composition of the present application can suitably satisfy the above-mentioned required physical properties, thereby being usefully used for constituting an optical element for HMDs.

The adhesive composition of the present application may have an appropriate viscosity. In one example, the adhesive composition may have a viscosity at room temperature of 200,000 cP or more as measured at a shear rate of 0.1 sec$^{-1}$. The viscosity may be 200,000 cP or more, 220,000 cP or more, 240,000 cP or more, 260,000 cP or more, 280,000 cP or more, or 300,000 cP or more. In one example, the viscosity of the adhesive composition may be, for example, 2,000,000 cP or less.

By controlling the viscosity in the above range, it is possible to secure adhesive force, and application processability such as required pattern printability.

In one example, the adhesive composition may comprise urethane (meth)acrylate. The urethane (meth)acrylate may have a urethane bond and may have at least two radical-curable functional groups. As the radical-curable functional group, for example, a (meth)acryloyl group is applied. The urethane (meth)acrylate may have 2 or more, 2 to 10, 2 to 9, 2 to 8, 2 to 7, 2 to 6, 2 to 5, 2 to 4, 2 to 3, or 2 functional groups. As the urethane (meth)acrylate, known materials can be used without particular limitation, and for example, polyester urethane (meth)acrylate, polybutadiene urethane (meth)acrylate, polyether urethane (meth)acrylate, caprolactone-modified urethane (meth)acrylate or pentaerythritol tetraacrylate (PETA) utilized hexa-functional urethane (meth)acrylate, and the like can be used, without being limited thereto.

In one example, as the urethane (meth)acrylate, aliphatic urethane (meth)acrylate can be used. Such a component can exhibit appropriate compatibility with other components contained in an adhesive composition, for constituting an optical element for HMDs, and as a result, an adhesive having low haze and excellent transparency can be formed.

The urethane (meth)acrylate is usually obtained by reacting a reaction product of a polyol and a diisocyanate with an acrylate compound having a hydroxyl group again. Accordingly, the aliphatic urethane (meth)acrylate may comprise an aliphatic polyol unit, a diisocyanate compound unit and a (meth)acrylate unit having a hydroxyl group at the terminal, which does not include an aromatic structure.

Here, as the aliphatic polyol, for example, aliphatic polyester polyol or polyether polyol, which is a polycondensation product of a polyhydric carboxylic acid such as adipic acid or maleic acid and an aliphatic diol such as diethylene glycol or 1,6-hexanediol, and the like, can be used. In one embodiment, the polyester polyol may comprise adipic acid and diethylene glycol units.

As the multifunctional isocyanate such as diisocyanate, methylenedicyclohexyl isocyanate or 1,6-hexamethylene diisocyanate, and the like can be used, and as the (meth)acrylate having a hydroxyl group at the terminal, hydroxyalkyl (meth)acrylate, for example, 2-hydroxyethyl (meth)acrylate, 2-hydroxypropyl (meth)acrylate, 4-hydroxybutyl (meth)acrylate or polyethylene glycol (meth)acrylate, and the like can be exemplified, without being limited thereto.

In one embodiment, the multifunctional aliphatic urethane (meth)acrylate may comprise a polyester polyol unit, a methylenedicyclohexyl diisocyanate unit and a hydroxyethyl (meth)acrylate unit, and the like.

Aliphatic urethane (meth)acrylates which can be applied in the present application are variously known and include, for example, BR-3042, BR-3641 AA, BR-3741 AB and BR-344 from Bomar Specialties Co. (Torrington, Conn.), CN8004, CN-9002, CN-980, CN-981, CN-9001NS, CN-9014, CN-9019 and CN9021 from Sartomer Company Inc (Exton, Pa.), PU2200 from Miwon, Genomer 4188/EHA, Genomer 4269/M22, Genomer 4425, Genomer 1122 and Genomer 6043 from Rahn AG (Switzerland), UV-3000B, UV-3630ID80, UV-004, UV-NS054, UV-7000B and UV-NS077 from Nippon Gohsei (Japan), UC-203 and UC-102 from Kuraray Company, Doublemer 5500 from Double Bond Chemical Ind., Co. Ltd, and the like, but are not limited thereto.

The urethane (meth)acrylate may have a weight average molecular weight (Mw) in a range of 1,000 to 100,000. In one embodiment, the weight average molecular weight (Mw) of the urethane (meth)acrylate may be, for example, 5,000 or more, 10,000 or more, 15,000 or more, 20,000 or more, 25,000 or more, or 30,000 or more, and may be in a range of 90,000 or less, 80,000 or less, 70,000 or less, 60,000 or less, or 50,000 or less.

The urethane (meth)acrylate of the present application may have a glass transition temperature (Tg) of 80° C. or lower. In another example, the glass transition temperature (Tg) may be 76° C. or lower, 72° C. or lower, 68° C. or lower, or 64° C. or lower, and the lower limit is not particularly limited, but may be, for example, −50° C. or higher.

The adhesive composition may comprise the urethane (meth)acrylate in a ratio of 50 to 90 weight % based on the weight of the total adhesive composition. In another embodiment, the ratio of the urethane (meth)acrylate may be 50 weight % or more, 51 weight % or more, 52 weight % or more, 53 weight % or more, 54 weight % or more, 55 weight % or more, 56 weight % or more, 57 weight % or more, 58 weight % or more, 59 weight % or more, 60 weight % or more, 61 weight % or more, 62 weight % or more, 63 weight % or more, 64 weight % or more, or 65 weight % or more, or may be 90 weight % or less, 89 weight % or less, 88 weight % or less, 87 weight % or less, 86 weight % or less, 85 weight % or less, 84 weight % or less, 83 weight % or less, 82 weight % or less, 81 weight % or less, or 80 weight % or less, but is not limited thereto.

It is possible to provide an adhesive composition having desired physical properties, such as excellent transparency, adhesiveness, viscosity and application processability, by controlling the ratio of urethane (meth)acrylate to the above range.

The adhesive composition may further comprise a thickener for securing an appropriate viscosity. As the thickener, for example, those known as thickening fillers and the like can be used. Such a filler can be exemplified by fumed silica (fumed silica), zeolite, clay or talc, and the like. Here, the fumed silica is ultrafine anhydrous silica (primary particle diameter is 500 nm or less, particularly 1 to 200 nm), and this anhydrous silica is ultrafine anhydrous silica (primary particle diameter is 500 nm or less, particularly 1 to 200 nm) produced by oxidizing, for example, silicon tetrachloride as a raw material in a vapor phase state in high-temperature flames, which can be exemplified by hydrophilic silica having high hydrophilicity and hydrophobic silica having high hydrophobicity.

As the hydrophilic silica, various commercially available products can be used, which can include, for example, AEROSIL 50, 130, 200, 300 and 380 (trade names, manufactured by NIPPON AEROSIL CO., LTD.), and the like. The specific surface areas of these hydrophilic silica products are 50±15 m$^2$/g, 130±25 m$^2$/g, 200±25 m$^2$/g, 300±30 m$^2$/g and 380±30 m$^2$/g, respectively. In addition, as the commercially available hydrophilic silica, REOLOSIL QS-10, QS-20, QS-30 and QS-40 (trade names, manufactured by Tokuyama Corporation), and the like can be used. The specific surface areas of these hydrophilic silica products are 140±20 m$^2$/g, 220±20 m$^2$/g, 300±30 m$^2$/g and 380±30 m$^2$/g, respectively. Besides, hydrophilic silica commercially available from CABOT Corporation may also be used. The specific surface area of the hydrophilic silica is preferably, for example, 20 to 600 m$^2$/g.

The hydrophobic silica may include, for example, AEROSIL RY200 and R202 which have been surface-treated with silicone oil and hydrophobized, AEROSIL R974, R972 and R976 which have been surface-treated with a dimethyl silylating agent and hydrophobicized, AEROSIL R805 which has been surface-treated with n-octyltrimethoxysilane and hydrophobicized, AEROSIL R811 and R812 which have been surface-treated with a trimethyl silylating agent and hydrophobicized (trade name, manufactured by NIPPON AEROSIL CO., LTD.), and REOLOSIL MT-10 which has been surface-treated with methyltrichlorosilane and hydrophobicized (trade name, manufactured by Tokuyama Corporaion), and the like. The specific surface areas of these hydrophobic silica products are 100±20 m$^2$/g, 100±20 m$^2$/g, 170±20 m$^2$/g, 110±20 m$^2$/g, 250±25 m$^2$/g, 150±20 m$^2$/g, 150±20 m$^2$/g, 260±20 m$^2$/g and 120±10 m$^2$/g, respectively. The specific surface area of the hydrophobic silica may be, for example, 20 to 400 m$^2$/g or so.

The thickener may be included in the adhesive composition in a ratio of 5 to 50 parts by weight relative to 100 parts by weight of the urethane (meth)acrylate, and the ratio may also be changed to secure the above-described viscosity.

In another example, the ratio of the thickener may also be about 45 parts by weight or less, 40 parts by weight or less, 35 parts by weight or less, 30 parts by weight or less, 25 parts by weight or less, or 20 parts by weight or less or so.

The adhesive composition may comprise a spacer. This may serve to maintain a cell gap between optical films in an optical element for HMDs. As the spacer, a spacer having a shape capable of maintaining a desired gap distance may be used without any particular limitation. For example, a ball spacer having a ball shape or other columnar spacers and the like may be used.

The size of the spacer is determined according to the distance of the desired gap, which is not particularly limited. For example, as the spacer, those having a D50 particle diameter in a range of 10 μm to 200 μm can be used. As known in the art, the D50 particle diameter means a particle diameter (median diameter) at a volume-based cumulative value of 50% in a particle size distribution, and is defined as the particle diameter at the point where the cumulative value is 50% in the cumulative curve where the particle size distribution is obtained on the basis of volume and the total volume is 100%. The methods of measuring the D50 particle diameter are variously known, where it is typically measured by a laser diffraction method or the like. The D50 particle diameter of the spacer may be 20 μm or more, 30 μm or more, 40 μm or more, or 50 μm or more, and may be 190 μm or less, 180 μm or less, 170 μm or less, 160 μm or less, or 150 μm or less, but is not limited thereto.

In one example, as the spacer, a spacer having a CV value of less than 20% can be used. The CV value is an index indicating a degree of unevenness of the particle diameter, and as the CV value is small, it means that the particle diameter is constant, where it is generally calculated by the following equation 1. Values required for confirmation of Equation 1, for example, D50 or standard deviation, and the like can be obtained by a laser diffraction method.

Equation 1

$CV(\%)$=(standard deviation of spacer particle diameter/D50 particle diameter of spacer)×100

In another example, the CV value of the spacer may be less than 20%, 19% or less, 18% or less, 17% or less, 16% or less, or 15% or less, or may be 0% or more, or greater than 0%.

By using the spacer having the CV value, it is possible to provide an adhesive composition having excellent adhesiveness, viscosity and application processability, and the like, while having a uniform thickness and exhibiting an appropriate gap holding ability.

The spacer may be included in the adhesive composition in a ratio of, for example, about 0.1 to 5 parts by weight relative to 100 parts by weight of the urethane (meth) acrylate. In another example, the spacer may be included in an amount of 0.1 parts by weight or more, 0.2 parts by weight or more, 0.3 parts by weight or more, 0.4 parts by weight or more, 0.5 parts by weight or more, 0.6 parts by weight or more, 0.7 parts by weight or more, 0.8 parts by weight or more, 0.9 parts by weight or more, 1 part by weight or more, or 1.1 parts by weight or more, and may be included in an amount of 5 parts by weight or less, 4.5 parts by weight or less, 4.0 parts by weight or less, 3.5 parts by weight or less, 3.0 parts by weight or less, 2.5 parts by weight or less, or 2 parts by weight or less or so, relative to 100 parts by weight of urethane (meth)acrylate, without being limited thereto.

The adhesive composition of the present application may further comprise a monofunctional or multifunctional acrylate compound. The acrylate compound is a compound different from the above-mentioned urethane (meth)acrylate. As such a compound, for example, a (meth)acrylic acid ester-based monomer can be used. The (meth)acrylic acid ester-based monomer may include monofunctional (meth) acrylate-based monomers and/or multifunctional (meth) acrylate-based monomers.

Specifically, the monofunctional (meth)acrylate-based monomer may be an alkyl group-containing (meth)acrylate-based monomer and/or a cycloalkyl group-containing (meth)acrylate-based monomer.

The alkyl group-containing (meth)acrylate-based monomer may be a (meth)acrylate having an alkyl group having 1 to 20 carbon atoms. Specifically, the (meth)acrylate monomer may comprise one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, isodecyl (meth)acrylate and tetradecyl (meth) acrylate.

In addition, the cycloalkyl group may comprise a carbon ring structure having no unsaturated bond in the functional group, and may comprise a monocyclic ring or polycyclic ring having 3 to 20 carbon atoms.

The cycloalkyl group-containing (meth)acrylate monomer may comprise one or more selected from the group consisting of cyclohexyl acrylate (CHA), cyclohexyl methacrylate (CHMA), isobornyl acrylate (IBOA), isobornyl methacrylate (IBOMA) and 3,3,5-trimethylcyclohexylacrylate (TMCHA).

For securing an appropriate effect, as the alkyl group-containing (meth)acrylate-based monomer, an alkyl (meth) acrylate having a linear or branched alkyl group with a carbon number of 5 or more, 6 or more, 7 or more, 8 or more, 9 or more, or 10 or more and 20 or less, or a (meth)acrylate monomer having the above cycloalkyl group can be used.

The multifunctional acrylate-based monomer may mean a multifunctional (meth)acrylate compound having two or more acryloyl groups. An example of the multifunctional (meth)acrylate compound may include hexane diol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tri(tetra)acrylate (PETA), or dipentaerythritol hexaacrylate (DPHA), and the like, but is not limited thereto.

The monofunctional or multifunctional acrylate compound may be contained in a range of 5 to 45 parts by weight relative to 100 parts by weight of the urethane (meth) acrylate. In another example, the ratio may be 5 parts by weight or more, 6 parts by weight or more, 7 parts by weight or more, 8 parts by weight or more, 9 parts by weight or more, or 10 parts by weight or more, or may be 45 parts by weight or less, 44 parts by weight or less, 43 parts by weight or less, 42 parts by weight or less, 41 parts by weight or less, 40 parts by weight or less, or 35 parts by weight or less or so, relative to 100 parts by weight of the urethane (meth) acrylate, but is not limited thereto.

The adhesive composition may also comprise a photoinitiator. As the photoinitiator, any photoinitiator can be used as long as it can initiate the polymerization reaction through light irradiation or the like. For example, it may include alpha-hydroxy ketone-based compounds (e.g. IRGACURE 184, IRGACURE 500, IRGACURE 2959, DAROCUR 1173; manufactured by Ciba Specialty Chemicals); phenylglyoxylate-based compounds (e.g. IRGACURE 754, DAROCUR MBF; manufactured by Ciba Specialty Chemicals); benzyldimethylketal compounds (e.g. IRGACURE 651; manufactured by Ciba Specialty Chemicals); α-aminoketone-based compounds (e.g. IRGACURE 369, IRGACURE 907, IRGACURE 1300, manufactured by Ciba Specialty Chemicals); monoacylphosphine-based compounds (MAPO) (e.g. DAROCUR TPO; manufactured by Ciba Specialty Chemicals); bisacylphosphine-based compounds (BAPO) (e.g. IRGACURE 819, IRGACURE 819DW; manufactured by Ciba Specialty Chemicals); phosphine oxide-based compounds (e.g. IRGACURE 2100; manufactured by Ciba Specialty Chemicals); metallocene-based compounds (e.g. IRGACURE 784; manufactured by Ciba Specialty Chemicals); iodonium salt (e.g. IRGACURE 250; manufactured by Ciba Specialty Chemicals); and mixtures of one or more thereof (e.g. DAROCUR 4265, IRGACURE 2022, IRGACURE 1300, IRGACURE 2005, IRGACURE 2010, IRGACURE 2020; manufactured by Ciba Specialty Chemicals), and the like, and one or two or more of the foregoing can be used, but is not limited thereto.

The photoinitiator may be included in a range of 0.1 to 2 parts by weight relative to 100 parts by weight of the urethane (meth)acrylate. The range may be 0.1 parts by weight or more, 0.2 parts by weight or more, 0.3 parts by weight or more, 0.4 parts by weight or more, or 0.5 parts by weight or more, and may be 2 parts by weight or less, 1.9 parts by weight or less, 1.8 parts by weight or less, 1.7 parts by weight or less, 1.6 parts by weight or less, or 1.5 parts by weight or less, relative to 100 parts by weight of the urethane (meth)acrylate, but is not limited thereto.

The adhesive composition may further comprise suitable additives in addition to the above-described components, if necessary, where an example thereof can be exemplified by an antifoaming agent and/or a silane coupling agent, and the like, but is not limited thereto.

The antifoaming agent is included in order to prevent bubbles and the like from being contained in the adhesive, which can exhibit low haze after curing of the composition. As the antifoaming agent, a silicon antifoaming agent, a fluorine antifoaming agent and an acrylic polymer antifoaming agent, and the like may be used, and among these, a silicon antifoaming agent that can be localized on the surface side after coating a hard coating composition to maintain a low surface energy, is preferred. As examples of commercially available antifoaming agents, BYK-306, BYK-307, BYK-310, BYK-313, BYK-333, BYK-371, BYK-377, BYK-378, BYK-3440, BYK-UV3500, BYK-3550 and BYK-UV3570 from BYK-Chemie, and TEGO Glide 100, TEGO Glide 450, TEGO Glide B1484, TEGO Glide 420, TEGO Glide 482, TEGO Glide 410 and TEGO Glide 415 from Degussa, and the like can be used.

The antifoaming agent may be included in a range of 0.1 to 10 parts by weight relative to 100 parts by weight of the urethane (meth)acrylate, but is not limited thereto.

The adhesive composition may further comprise a silane coupling agent. The silane coupling agent may improve adhesive force and wettability of the adhesive composition. The silane coupling agent is not particularly limited, which may be gamma-glycidoxypropyl triethoxysilane, gamma-glycidoxypropyl trimethoxysilane, gamma-glycidoxypropylmethyl diethoxysilane, 3-mercaptopropyl trimethoxysilane, vinyl trimethoxysilane, vinyl triethoxysilane, gamma-methacryloxypropyl trimethoxysilane, gamma-methacryloxypropyl triethoxysilane, gamma-aminopropyl trimethoxysilane, gamma-aminopropyl triethoxysilane, 3-isocyanatopropyl triethoxysilane, gamma-acetoacetatepropyl trimethoxysilane, gamma-acetoacetatepropyl triethoxysilane, beta-cyanoacetyl trimethoxysilane, beta-cyanoacetyl triethoxysilane, acetoxyacetotrimethoxysilane, 3-methacryloxypropyl trimethoxysilane, 3-methacryloxypropyl triethoxysilane, 3-acryloxypropyl trimethoxysilane, 3-acryloxypropyl triethoxysilane, 3-methacryloxymethyl triethoxysilane, 3-methacryloxymethyl trimethoxysilane, 3-acryloxypropylmethyl dimethoxysilane, methacryloxymethylmethyl dimethoxysilane, methacryloxymethylmethyl diethoxysilane, methacryloxypropylmethyl dimethoxysilane, methacryloxypropylmethyl diethoxysilane, methacryloxypropyldimethyl methoxysilane or methacryloxypropyldimethyl ethoxysilane. The silane compound may be included in an amount of, for example, 0.1 parts by weight to 10 parts by weight, 0.3 to 8 parts by weight, 0.7 parts by weight to 5 parts by weight, 0.8 parts by weight to 3 parts by weight, 0.9 parts by weight to 2.5 parts by weight, or 0.9 parts by weight to 1.8 parts by weight, relative to 100 parts by weight of the photocurable compound and the thermosetting compound as described above. The silane compound can improve heat resistance and moisture resistance by improving adhesion and adhesion stability of an adhesive composition, and can act to improve adhesion reliability even when it has been left in a harsh condition for a long period of time.

The adhesive composition of the present application can form an adhesive exhibiting excellent light transmittance and low haze. In one example, the adhesive composition may have a haze of 5% or less, 4% or less, 3% or less, 2% or less, or 1% or less as measured according to JIS K7105 or ASTM D1003 standard after curing, where the lower limit of the haze may be 0% or 0.01%. The optical characteristic may be measured at 550 nm using a UV-Vis spectrometer.

The present application also relates to an optical element. In one example, the optical element may be an optical element applied to the HMD. The optical element may comprise at least two optical films disposed to be spaced apart from each other and an adhesive that attaches the optical films to each other while maintaining a gap between the two optical films. Here, the adhesive may be a cured layer of the above-described adhesive composition, and such an adhesive may be pattern-printed on a part of the surface of each of the optical films, for example, the edge portions or the like, other than the entire surface.

The kind of the optical film included in the optical element is not particularly limited, which may be a known film applied to construct the HMD. An example of such a film includes a diffraction plate, a light guide plate, a diffractive light guide plate, and the like.

Thus, in one example, the optical element of the present application may comprise a cured layer of the above-mentioned adhesive composition and a diffractive light guide plate. The diffractive light guide plate may mean a light guide plate having a diffraction grating for diffracting light so that light incident on the light guide plate is totally reflected within the light guide plate or in order to emit the light, which propagates the interior of the light guide plate by total reflection, from the light guide plate. The diffraction grating may be, for example, a holographic diffraction grating. The diffraction grating may be a reflective diffraction grating or a transmissive diffraction grating, and the diffraction grating included in the light guide plate may comprise a reflective diffraction grating and a transmissive diffraction grating together. In this case, the reflective diffraction grating may have a configuration to function as a reflecting mirror, and the transmissive diffraction grating may have a configuration to function as a semi-transmissive mirror.

In one example, the optical element comprises two or more diffractive light guide plates disposed opposite to each other, where a cured layer of the above-mentioned adhesive composition may be present between the diffractive light guide plates. When the optical element comprises two or more diffractive light guide plates, the diffraction grating included in the two or more diffractive light guide plates may be diffraction grating layers corresponding to light of different wavelength bands from each other, respectively. In this case, the optical element may have a structure in which two or more diffractive light guide plates are laminated, and may promote increase of diffraction efficiency, increase of a diffraction reception angle and optimization of a diffraction angle, when the light corresponding to each wavelength band of each diffractive light guide plate is reflected and/or diffracted at the respective diffraction gratings.

The method of manufacturing the diffractive light guide plate is not particularly limited, and for example, a method of irradiating a photosensitive material with object light and reference light, and recording interference stripes formed by the object light and the reference light inside a member constituting a diffraction grating, and the like may be used. As the photosensitive material, a photopolymer, a photoresist, a silver halide emulsion, a dichromated gelatin, a photographic emulsion, a photothermoplastic or a photorefractive material, and the like may be used, without being limited thereto.

The present application also relates to an image display device. The image display device of the present application may comprise the above-described optical element, and may be, for example, an HMD. In one example, the image display device may be an image display device applied to a wearable device, smart glasses, a see-through head mounted display (HMD), or the like.

Specifically, the image display device may be an image display device included in a see-through head mounted display (HMD). The image display device may comprise an image forming device and the above-described optical element. The image forming device may be a liquid crystal display (LCD), a plasma display panel (PDP), a field emission display (FED) or an organic display panel (organic light emitting diode (OLED)). The optical element may be configured so that the light emitted from the image forming device is converted into parallel light and the parallel light is capable of being emitted toward an observer's pupils. By applying the above-described optical element, the image display device of the present application can realize a see-through image display device, and can realize augmented reality and mixed reality head mounted displays.

Advantageous Effects

The present application can provide, for example, as an adhesive composition which has printability that printing can be effectively performed into a pattern with a thin width or the like, and is capable of forming an adhesive having excellent physical properties such as transparency, a gap maintaining ability capable of maintaining a constant cell gap between films and adhesive force, an adhesive composition useful for constituting an optical element for HMDs.

Mode for Invention

The present application will be described in detail below with reference to examples according to the present application and comparative examples not complying with the present application, but the scope of the present application is not limited to the following examples.

1. Viscosity Measurement

Viscosities of the adhesive compositions prepared in Examples and Comparative Examples were measured using ARES G2, a viscometer of TA Instruments, as follows. The viscosities of the prepared adhesive compositions were each measured using 25 mm aluminum cone and plate at room temperature (25° C.) under a cell gap condition of 0.1 mm. The shear rate upon the measurement was set as the range of 0.01 to 10.0/s and the viscosity at a shear rate of 0.1/s was described.

2. Haze Measurement

An adhesive composition is applied between soda-lime glasses with a thickness of 1T and then the glasses are bonded together by pressing them for 5 minutes with a 1 kg weight. The bonded sample was irradiated with a metal halide light source at a light quantity of 3 J/cm² to perform the photo-curing. For the photo-cured sample, the haze was measured using an NDH-5000 haze meter from Nippon Denshoku Co. according to ASTM D1003 measurement standard.

3. Cell Gap Measurement

An adhesive composition was applied on the outer edge of a glass substrate nanoimprinted with a diffraction pattern in a line width of about 0.8 mm using a SHOTMASTER400ΩX from Mushashi Engineering, a tempered glass (bare glass) of the same size was placed thereon, and they were pressed with a weight of 1 kg for 5 minutes and bonded together to to prepare a test element. Ten positions were randomly selected from the cross section of the element, and the cell gaps were measured with an optical microscope and recorded.

4. Evaluation of Application Processability

An adhesive composition was applied on the outer edge of a glass substrate nanoimprinted with a diffraction pattern in a line width of about 0.8 mm using a SHOTMASTER400ΩX from Mushashi Engineering, a tempered glass (bare glass) of the same size was placed thereon, and they were pressed with a weight of 1 kg for 5 minutes and bonded together to prepare a test element. The test element was observed under a microscope to measure the line width change relative to the early application, and then the application processability was evaluated by the following criteria.

Evaluation Criteria

P: When the line width change is less than 30% relative to the early application and the adhesive line is formed in a uniform shape after the bonding NG: The line width change is 30% or more relative to the early application and the adhesive line is not uniform after the bonding

EXAMPLE 1

An aliphatic urethane (meth)acrylate (CN9001NS, Sartomer), isobornyl acrylate (SR506NS, Sartomer) as an acrylate compound, a photoinitiator (Irgacure 819, BASF), a spacer (Micropearl GS-L200, Sekisui Chemical Co., Ltd.), a thickener (fumed silica, R805, Evonik), an antifoaming agent (BYK-1794, BYK) and a silane coupling agent (KBM-403, Shin-etsu) were compounded in ratios shown in Table 1 below, and mixed in a reactor (paste mixer, Thinky, AR-100) for 10 minutes to prepare an adhesive composition.

The adhesive composition was applied on the outer part of a glass substrate using a SHOTMASTER400ΩX from Mushashi Engineering in a line width of about 0 8 mm, a tempered glass (bare glass) of the same area was placed thereon, and then they were bonded together for 5 minutes using a weight of about 1 kg. After the bonding, the adhesive composition was cured by irradiating it with light at a light quantity of 3000 mJ/cm² or so as a metal halide light source having a wavelength of 200 to 450 nm to form an adhesive layer.

EXAMPLES 2 AND 3 AND COMPARATIVE EXAMPLES 1 TO 3

A curable composition was prepared in the same manner as in Example 1, except that the used materials and ratios at the time of preparing the adhesive composition were changed as shown in Table 1 below.

TABLE 1

|  |  | Example | | | Comparative Example | | |
| --- | --- | --- | --- | --- | --- | --- | --- |
|  |  | 1 | 2 | 3 | 1 | 2 | 3 |
| Urethane (meth)acrylate | A | 65 | 20 | 80 |  | 65 | 80 |
|  | B |  | 50 |  |  |  |  |
|  | C |  |  |  | 50 |  |  |
|  | D |  |  |  | 20 |  |  |
| Acrylate compound | A | 20 | 10 | 5 | 15 | 20 | 5 |
|  | B |  | 5 | 5 |  |  | 5 |
| Photoinitiator (Irgacure 819, BASF) |  | 0.5 | 0.5 | 0.5 | 0.5 | 0.5 | 0.5 |
| Spacer (Micropearl GS-L200, Sekisui Chem) |  | 1 | 1 | 1 | 1 | 1 | — |
| Thickner (fumed silica, R805, Evonik) |  | 12 | 12 | 7 | 12 | — | 12 |
| Antifoaming agent (BYK-1794, BYK) |  | 0.5 | 0.5 | 0.5 | 0.5 | 0.5 | 0.5 |
| Silane coupling agent (KBM-403, Sihn-etsu) |  | 1 | 1 | 1 | 1 | 1 | 1 |

Content unit: part by weight
Urethane (meth)acrylate A: CN9001NS, Sartomer
Urethane (meth)acrylate B: PU2200, Miwon
Urethane (meth)acrylate C: CN9167, Sartomer
Urethane (meth)acrylate D: CN3108NS, Sartomer
Acrylate compound A: isobornyl acrylate (SR506NS, Sartomer)
Acrylate compound B: lauryl acrylate (SR335, Sartomer)

Physical properties confirmed in Examples 1 to 3 were summarized and described in Table 2 below.

TABLE 2

|  | Example | | | Comparative Example | | |
| --- | --- | --- | --- | --- | --- | --- |
|  | 1 | 2 | 3 | 1 | 2 | 3 |
| Viscosity (unit: cP) | 350,000 | 420,000 | 300,000 | 510,000 | 110,000 | 300,000 |
| Haze (unit: %) | 0.8 | 0.7 | 0.8 | 9.5 | 0.8 | 0.8 |
| Cell gap (unit: μm) | 100 ± 2 | 100 ± 2 | 100 ± 2 | 100 ± 2 | 20 ± 5 | 20 ± 10 |
| Application processability | P | P | P | P | NG | P |

From the table, it can be confirmed that the adhesive compositions of Examples show excellent application processability through the proper viscosities and simultaneously form transparent adhesives securing a uniform cell gap. On the other hand, Comparative Example 1 containing aromatic urethane (meth)acrylate formed an opaque adhesive while exhibiting high haze, Comparative Example 2 had poor application processability due to the low viscosity, and Comparative Example 3 did not secure a desired cell gap.

What is claimed is:

1. An adhesive composition, comprising:
   an aliphatic urethane (meth)acrylate;
   a thickener; and
   a spacer,
   wherein the adhesive composition has a viscosity of 200,000 cP or more at room temperature at a shear rate of 0.1 sec$^{-1}$.

2. The adhesive composition according to claim 1, wherein the aliphatic urethane (meth)acrylate comprises units of aliphatic polyol, diisocyanate compound and (meth)acrylate having a hydroxyl group at its terminal.

3. The adhesive composition according to claim 1, wherein the aliphatic urethane (meth)acrylate has a glass transition temperature of 80° C. or lower.

4. The adhesive composition according to claim 1, wherein the aliphatic urethane (meth)acrylate has a weight average molecular weight in a range of 1,000 to 100,000.

5. The adhesive composition according to claim 1, wherein the aliphatic urethane (meth)acrylate is comprised in the adhesive composition in a range of 50 to 90 weight %.

6. The adhesive composition according to claim 1, wherein the thickener is fumed silica, clay, zeolite or talc.

7. The adhesive composition according to claim 1, wherein the thickener is comprised in an amount from 5 to 50 parts by weight relative to 100 parts by weight of the aliphatic urethane (meth)acrylate.

8. The adhesive composition according to claim 1, wherein the spacer has a D50 particle diameter in a range of from 10 μm to 200 μm.

9. The adhesive composition according to claim 1, wherein the spacer has a CV value (%) of less than 20%, and
   wherein the CV value (%) satisfies Equation 1:
   Equation 1
   CV value (%)=(standard deviation of particle diameter of the spacer/D50 particle diameter of the spacer)×100.

10. The adhesive composition according to claim 1, wherein the spacer is comprised in an amount of from 0.1 to 5 parts by weight relative to 100 parts by weight of the aliphatic urethane (meth)acrylate.

11. The adhesive composition according to claim 1, further comprising a monofunctional or multifunctional acrylate compound.

12. The adhesive composition according to claim 1, further comprising a photoinitiator.

13. The adhesive composition according to claim 1, wherein the adhesive composition is applied to an optical element for head mounted displays.

14. An optical element used in a head mounted display, comprising:
   two optical films spaced apart from each other and
   a cured layer of the adhesive composition of claim 1 that attaches the optical films to each other while maintaining a gap between the two optical films.

15. The optical element for head mounted displays according to claim 14, wherein the optical film is a diffraction plate, a light guide plate or a diffractive light guide plate.

16. A head mounted display comprising the optical element of claim 14.

* * * * *